Patented Dec. 3, 1935

2,023,367

UNITED STATES PATENT OFFICE 2,023,367

INDUSTRIAL WATER COMPOSITION

Karl Krekeler, Hamburg, Germany, assignor to Shell Development Company, San Francisco, Calif., a corporation of Delaware No Drawing. Application November 25, 1933, Serial No. 699,806. In Germany November 28, 1932

5 Claims. (Cl. 252—5)

The invention concerns a treating material for aqueous liquids coming into contact with metals, especially at temperatures not above their boiling points, which liquids cause corrosion and/or formation of incrustations or deposits.

Water, when it is in contact with air or oxygen-containing gases, has a corroding action upon different metals, or their alloys, which may contain non-metals, such as carbon, silicon, sulphur, phosphorus, etc., as admixtures. In so far as this subject concerns the steel used in industry, this effect of corrosion may be regarded, for example, as follows:

1. An effect on water-washed jackets of Diesel engines when water is used as a cooling means for pistons, piston rods, cylinder heads, and cylinder walls. This water is commonly intermingled with air, in order to obtain a certain buffer action. For this reason the corroding effect of the water is considerably increased. Sometimes permanent cracks appear in piston rods of Diesel engines, which are traceable to such corrosion.

2. An effect on hydraulic apparatus, which are operated by means of water, such as hydraulic presses, lifting platforms, hydraulically raised purifier covers in gas plants, water seals for the purifier covers, gas holder, water-filled gas meters, etc. and in which water is constantly in contact with the metal with brisk stirring. Here very heavy corrosion and rusting occur, which disturb the operation by injuring the surfaces through corrosion or by preventing the ordinary operation of the machine parts.

3. In other apparatuses, such as radiators in motorcars, scale is formed.

It was found that all the described disadvantages can be avoided and the lifetime of the apparatuses can be lengthened if mineral oil-soap mixtures, if necessary with other additions, are added to such aqueous liquids causing corrosion.

The mixtures should form as fine emulsions as possible with the aqueous liquids, in order for each drop to make its effect useful. An especially good emulsion is obtained when the alkali salts of mineral oil sulphonic acids soluble in mineral oils, or sulphonated naphthenic acids, are incorporated into water together with a quantity of a mineral oil.

Especially favourable results were obtained with a mixture, which consisted of 15 parts of the above-mentioned sulphonic acid soap and 81 parts of a spindle oil.

Rather small amounts of active anti-corrosive material are sufficient to produce an emulsion which is useful for the purposes named. In general, the limits lie between 0.5–5% of the material with respect to water.

Larger amounts may be used, but generally is not necessary.

In case the emulsion is to be used as a cooling medium, for example in Diesel engines, where the adjustments of the jacket and cooling surfaces are regulated by the thermal conductivity of the water, it becomes desirable that the emulsion must have a good heat conductivity little deviating from that of the water.

It was found, that up to a concentration of about 1.6%, the heat conductivity of the emulsion differs only immaterially from that of pure water. An addition up to 1.6% of the mineral oil-soap mixture forms in such cases the preferred limit of concentration. A further advantage of using the emulsion is its effect upon scale deposits on cooling surfaces; these deposits are loosened and removed, when the emulsion of this invention is used as a cooling medium.

In order to maintain an effective concentration of the oil-soap mixture in cooling water, a constant control of the content of the emulsion must be undertaken.

Besides the above-described applications, the oil sulfonic soap mixture can be used in steam engine condensers, where it prevents the formation of boiler scale, and in heating apparatus of central heating plants, while the latter are not in operation. As stated hereinbefore, the application of the anti-corrosive mixture of this invention is limited to temperature conditions below boiling temperature of water.

I claim as my invention:

1. A non-corrosive emulsion for filling metal cooling systems consisting of water and a small quantity of a mixture comprising an emulsifiable mineral oil and a substantial amount of an alkali soap of an acid selected from the group consisting of: sulfonated naphthenic acids and mineral oil sulfonic acids.

2. A non-corrosive emulsion for filling metal cooling systems comprising water and a mixture consisting of approximately 85% of an emulsifiable mineral oil and 15% of an alkali soap of oil soluble sulfonic acids derived from mineral oil.

3. A non-corrosive emulsion for filling metal cooling systems comprising water and less than 5% of a mixture consisting of approximately 85% of an emulsifiable mineral oil and 15% of an alkali soap of oil soluble sulfonic acids derived from mineral oil.

4. A non-corrosive emulsion for filling metal cooling systems comprising water and less than 1.6% of a mixture consisting of approximately 85% of an emulsifiable mineral oil and 15% of an alkali soap of oil soluble sulfonic acids derived from mineral oil.

5. In operating machinery wherein an aqueous cooling medium comes in contact with metallic surfaces, the step of minimizing corrosion of said surfaces by incorporating into the cooling medium a small quantity of a mixture comprising approximately 85% of an emulsifiable mineral oil and 15% of an alkali soap of oil-soluble sulfonic acids derived from mineral oil.

KARL KREKELER.